May 10, 1932.   H. J. BURNISH   1,857,526

METHOD OF ELECTRIC WELDING PRESSURE VESSELS

Filed Dec. 16, 1929

INVENTOR.

Howard J. Burnish

BY *[signature]*

ATTORNEY.

Patented May 10, 1932

1,857,526

UNITED STATES PATENT OFFICE

HOWARD J. BURNISH, OF MILWAUKEE, WISCONSIN, ASSIGNOR TO A. O. SMITH CORPORATION, OF MILWAUKEE, WISCONSIN, A CORPORATION OF NEW YORK

METHOD OF ELECTRIC WELDING PRESSURE VESSELS

Application filed December 16, 1929. Serial No. 414,387.

This invention relates to a method of electric welding pressure vessels.

The invention is particularly applicable to the welding of tubular connections to thick walled pressure vessels.

An object of the invention is to provide a novel method of welding a tubular connection to a flat or curved thick metal plate.

A more specific object of the invention is to more accurately center the tubular connection with respect to an opening in the plate or vessel wall.

An embodiment of the invention is illustrated in the accompanying drawings in which the views are as follows.

Figure 1:
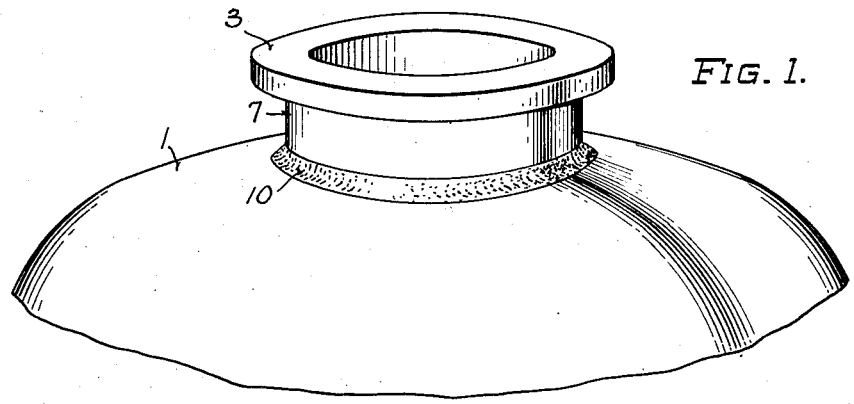
Figure 1 is a perspective view of a manway welded to a pressure vessel.
Figure 2:
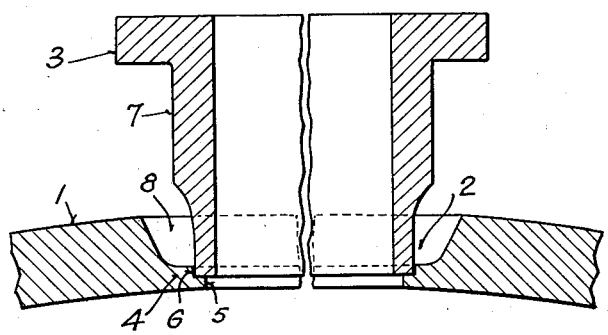
Fig. 2 is a longitudinal section through a manway and the adjacent portion of the vessel showing the parts prepared for welding.
Figure 3:
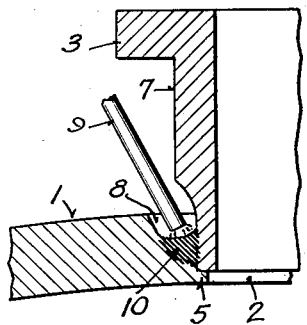
Fig. 3 is a similar view showing a manway and the adjacent portion of the vessel during the first step of the welding operation.

The thick wall 1 of the pressure vessel is provided with an opening 2, which is greater in diameter than the inside diameter of the manway 3 to be welded in the opening. The thick wall 1 around the opening 2 is chamfered, forming an annular lip 4. The lip 4 is chamfered to form a small annular projection 5 and a shoulder 6.

The wall 7 of the manway 3 has its end chamfered to reduce its outside diameter sufficiently to cause the manway to rest upon the annular projection 5 when it is inserted into the opening 2. The shoulder 6 prevents lateral movement of the manway 3 after it is inserted into the opening 2 and positioned for welding.

An annular welding groove 8 is formed by the lip 4, which serves as the bottom, and the wall 7 of the manway 3 and the wall 1 of the pressure vessel, which serve as sides of the groove.

One terminal of a source of welding current is attached to the work and the other to a fusible metallic weldrod 9. The welding circuit is closed, and the metallic weldrod 9 is touched against the lip 4 at the bottom of the welding groove 8 and quickly withdrawn, striking an arc between the weldrod and the bottom of the groove. The intense heat causes the weldrod 9 to fuse away and to fill the welding groove 8 with molten welding metal 10.

Figure 4:
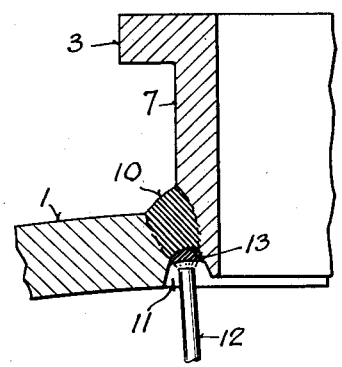
Fig. 4 is a longitudinal section through a manway and the adjacent portion of the vessel showing a later welding step.
Figure 5:
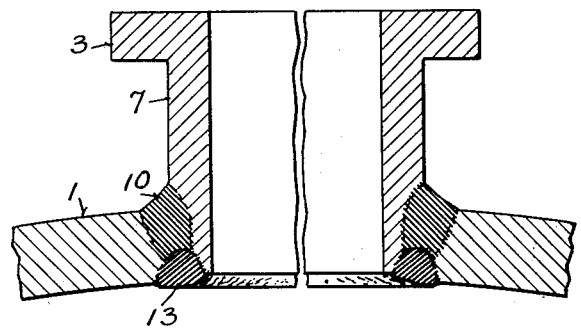
Fig. 5 is a similar view showing the completed weld.

When the groove 8 is substantially filled, the lip 4 and the projection 5 are burned away, preferably by an electric arc, to form an annular welding groove 11 inside the vessel between the wall 1 of the vessel and the wall 7 of the manway 3, as shown in Fig. 4.

An arc is then struck between a metallic weldrod 12 and the bottom of the welding groove 11 and the groove 11 is filled with molten welding metal 13 to complete the weld.

This invention provides a rapid and accurate method for centering the tubular connection in the opening in the wall of the pressure vessel.

Various modifications may be used within the scope of this invention.

I claim:

1. The process of welding a tubular connector to a thick walled vessel having an opening, comprising chamfering the wall defining the opening to provide a welding groove and a shoulder for receiving and centering the connector, shaping the wall of the connector to seat on the shoulder, mounting the connector on the shoulder to center it and complete the welding groove, and welding from both sides of the vessel wall to fuse the shoulder and lower edge of the connector together and deposit weld metal uniting the connector and vessel wall.

2. The process of welding a tubular connector to a thick walled vessel having an opening, comprising chamfering the wall defining the opening to provide a dish shaped depression in the upper surface of the vessel around the opening and a shoulder for receiving and centering the connector, mounting the connector on the shoulder to center it and complete the welding groove, depositing metal in the welding groove by means of an electric arc, and welding from the lower side to use the shoulder and lower edge of the connector together and deposit additional weld metal to unite the connector and vessel wall.

3. The process of welding a tubular connector to a thick walled vessel having an opening, comprising chamfering the wall defining the opening to provide a welding groove and a shoulder for receiving and centering the connector, chamfering the wall of the connector to reduce the thickness of the lower edge and prepare it for seating on the shoulder, mounting the connector on the shoulder to center it and complete a welding groove, depositing metal in the welding groove by means of an electric arc, and welding from the lower side to fuse the shoulder and lower edge of the connector and deposit additional weld metal to unite the connector and vessel wall.

4. The process of welding a tubular connector to a thick walled vessel having an opening, comprising chamfering the wall defining the opening to provide a welding groove and a shoulder for receiving and centering the connector, chamfering the wall of the connector to reduce the thickness of the lower edge and prepare it for seating inside the shoulder, mounting the connector with its lower end edge inside the shoulder to center it and complete the weld groove, and welding from both sides of the vessel wall to fuse the shoulder and lower edge of the connector together and deposit weld metal to unite the connector and vessel wall.

In witness whereof, I have hereunto signed my name at Milwaukee, Wisconsin, this 13th day of December, 1929.

HOWARD J. BURNISH.